Sept. 8, 1953        J. P. LANFEAR        2,651,671
ELECTRICAL CONNECTION

Filed March 17, 1951

INVENTOR
JOSEPH P. LANFEAR

BY Milton Zucker

ATTORNEY

Patented Sept. 8, 1953

2,651,671

UNITED STATES PATENT OFFICE 2,651,671

ELECTRICAL CONNECTION

Joseph P. Lanfear, Long Island City, N. Y.

Application March 17, 1951, Serial No. 216,166

6 Claims. (Cl. 174—94)

This invention relates to electrical connectors, and is directed specifically to a connector for electric wires and cables which makes an unusually strong mechanical connection, combined with a positive electrical connection, with minimum effort, in a minimum time, and at low cost.

In laying electrical cable out-of-doors, particularly in extreme weather conditions, it is rather difficult to get a mechanical splice with any substantial strength. Such mechanical strength is important particularly where the wire is being laid under emergency conditions, as in military operations. Here, mechanical strength, speed, and simplicity in manipulation are the desired characteristics.

I have invented an electrical connector which can be produced cheaply, and which can be used under extreme weather conditions to splice prepared cable ends in a single operation, using a simple instrument like a wide jawed plier, which yet yields a positive electrical connection, plus a very strong mechanical union which will resist pulls of the order of 100 pounds.

My device consists of a pair of male and female cover plates of conductive material, which together provide a wire way in which the ends of the wires to be spliced are laid. Each end of the pair of cover plates is provided with channels to receive a trident shaped ram, one tine going into a channel on one cover plate, the central tine going down into the wire way through a matching central channel, and the third tine going into a matching channel on the second cover plate. Opposite the channel, to receive the central tine of the ram, is a depression in the wire way; when the ram is driven down into position, it drives the wire into this depression, and holds it there firmly against any pull. The rams are preferably constructed with serif-like projections on the ends of the outside tines, which hook into depressions at the bottom ends of their respective channels, to lock them in place. Alternatively, and less desirably, the rams may be secured to the connector by screws; this makes a connector which can be separated, but is much slower to assemble.

Preferred embodiments of my invention are shown in the accompanying drawings, in which Figure 1 is a section through a connector, along the line 1—1 of Fig. 2, showing two wires held in place by the rams.

Figure 1:
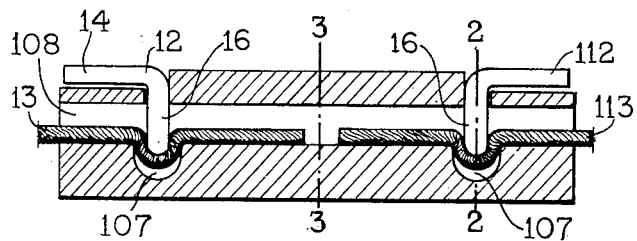

Referring to the drawings, my connector consists of a male member 10, a female member 11, and two rams 12, 112, serving to splice wires 13, 113. Each of the rams consists of an L-shaped piece of metal, one leg of which lies on the outside of the assemblage and is used as a convenient means of transmitting force to the other leg, which is trident shaped, consisting of a base 15, a short rather thick central tine 16, and outside tines 17, 117, each provided at its end with an inwardly extending serif-like projection 18, 118.

The male member 10 is essentially a flat piece of metal with a pair of lugs 101 projecting from it, machined to fit a pair of indentations 102 cut into the female member 11. Z- or S-shaped channels 103 (depending on the side of viewing) are cut into the face of member 10 on the side opposite the lugs 101. The top of the member, from each channel 103 to its end, is cut away by the thickness of the lug 14 of the ram member to provide a shoulder 104 which will support the leg of the ram so that its top is just level with the top of the member.

The female member 11 is, as indicated, cut away to provide indentations 102 to receive the lugs 101 of the male member. Like the member 11, it has Z-shaped channels 103 cut into the face opposite its indentations, and is cut away to provide shoulders 104 to hold the lugs 14 of the rams level with the face of the member 11.

A longitudinal slit 105 is cut through the member 11, so that in cross section it looks like a U. The wires to be spliced 13, 133 are laid in this slit.

The top leg of the prone U is provided with channels 106 in line with the Z-shaped channels 103; opposite these channels 106, in the bottom leg of the U, there are provided cut out portions 107.

The device is assembled by fitting the lugs 101 of the female member 10 into the indentations 102 in the male member 11. The rams 12, 112 are then mounted in the sets of channels 103, 106, 103, with the serif-like projections 18, 118 of the tines 17, 117 between the horizontal face of the Z-S channels 103, 103 and their slanting faces, and with the tines 16 above or in the channels 106. The pieces are so machined that in this position, there is rather a tight fit, so that considerable force, normal to the tops of the rams, is required to move it downward; preferably the assemblage is so designed that ordinary pressure of the hand will not force the rams 12, 112 down. This will prevent premature locking of the rams, which can be moved only by extra force applied, as by a pair of pliers.

Figure 3:
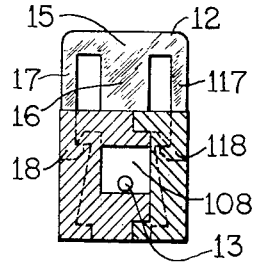
Figure 3 is a modified section along the line 3—3 of Figure 1, but showing the ram raised.
Figure 4:
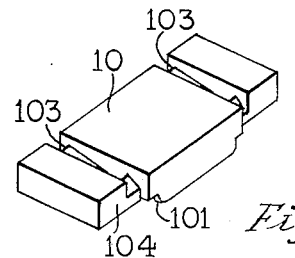
Figure 4 is a perspective view of the male member, but on its side to move clearly show the details of construction.

In use, the assembled device see Fig. 3 is laid out, and the wires 13, 113 to be spliced are pushed into the wireway 106. Mechanical pressure is applied to the device; a wide jawed pliers can be used to push both rams down at one time. The tines 16 push the wires into the indentations 107; the tines 17, 117 slide along the diagonals of the Z-S channels 103, and their projecting ends 18, 118 catch under the bottom surfaces of the channels.

Figure 2:
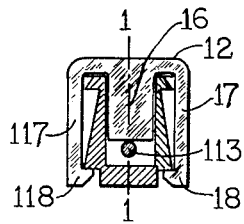
Figure 2 is a section through the line 2—2 of Figure 1.

The resultant connection (Figs. 1 and 2) has no projections and no indentations; the indentations on the channel members are filled by the legs 14 and the outer tines 17, 117 of the rams. The wires are jammed in so that they cannot pull out, and are in tight electrical contact with each other through the metal of the channels. All that remains is to insulate.

It should be noted that with prepared wire and insulation, only three motions are required to complete the connection (1) insert wire 13, (2) insert wire 113, (3) clamp. Furthermore, these motions can be made with gloved or even mittened hands, thus providing a positive connection under even the most adverse conditions.

Tests made on the device indicate that the joints so made will easily stand 100 pounds of pull, hence, the connector is suitable for field use.

The problem of insulation can be solved by taping. More desirably, an insulator is provided to fit the connector, with pressure sensitive adhesive on the ends to insure a seal all around.

Figure 6:
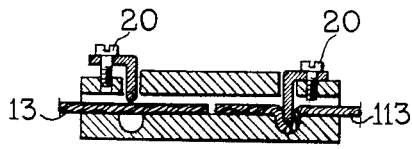
Figure 6 is a section, similar to Figure 1, of a modified form of the device.
Figure 5:
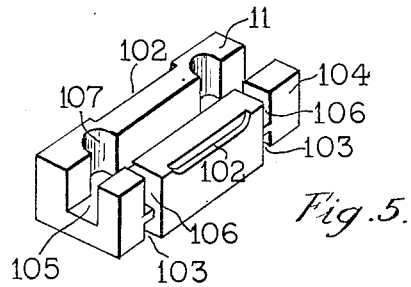
Figure 5 is a similar perspective of the female member.

While the preferred form of my device, as shown above, serves a unique function, it cannot be dissembled. The mechanical strength of my preferred device can be obtained, with a device which can be dissembled, at the loss of some simplicity in assembly. Such a modification is shown in Fig. 6. There, the lugs 18, 118 are dispensed with, and the rams are locked to the assemblage by screws 20.

Obviously, modifications can be made in the device without departing from the scope of the invention which is defined in the claims.

I claim:

1. An electrical connector comprising male and female conducting members cut out to provide a wireway in the interior of their assemblage, indentations in the wireway, primary channels into the wireway opposite each indentation, secondary channels on each outside surface of the connector in line with the channels into the wireway, trident shaped rams mounted on the connector with their outside tines in the secondary channels and their inside tines in the primary channels, the inside tines being just long enough, when the rams are pushed down, to jam a wire against the bottoms of the indentations, and means for locking the rams in their downward position.

2. The connector of claim 1, in which the secondary channels are S-shaped on one surface of the connector and Z-shaped on the opposite surface, and the outside tines have inwardly projecting integral pawls on their bottom ends, the pawls resting on the diagonal portion of the secondary channels in their raised position, and locking under the bottom horizontal portions of the secondary channels in their downward position.

3. The connector of claim 1, in which the rams are L-shaped, the horizontal portion of the L being solid and the vertical portion trident shaped, and the conducting members are cut away so that in downward locked position the tops of the horizontal legs of the rams are level with the rest of the assemblage.

4. The connector of claim 3, in which the rams are detachably locked to the conducting members by means of screws passing through the horizontal legs of the rams into a conducting member.

5. The connector of claim 2, in which the rams are L-shaped, the horizontal portion of the L being solid and the vertical portion trident shaped, the conducting members being cut away so that in downward locked position the tops of the horizontal legs of the rams are level with the rest of the assemblage, and the bottoms of the secondary channels being cut away to exactly fit the inwarding projecting integral pawls, so that the entire assemblage is smooth on the outside.

6. The connector of claim 2, in which the parts are sufficiently tightly fitted that positive pressure must be applied normal to the top of the rams to force them into their downward position.

JOSEPH P. LANFEAR.

References Cited in the file of this patent

FOREIGN PATENTS

| Number | Country | Date |
| --- | --- | --- |
| 266,746 | Switzerland | May 1, 1950 |
| 369,579 | Germany | Oct. 7, 1921 |